July 24, 1934.  J. W. BRYCE  1,967,741
TABULATING MACHINE
Filed Feb. 25, 1931  6 Sheets-Sheet 1
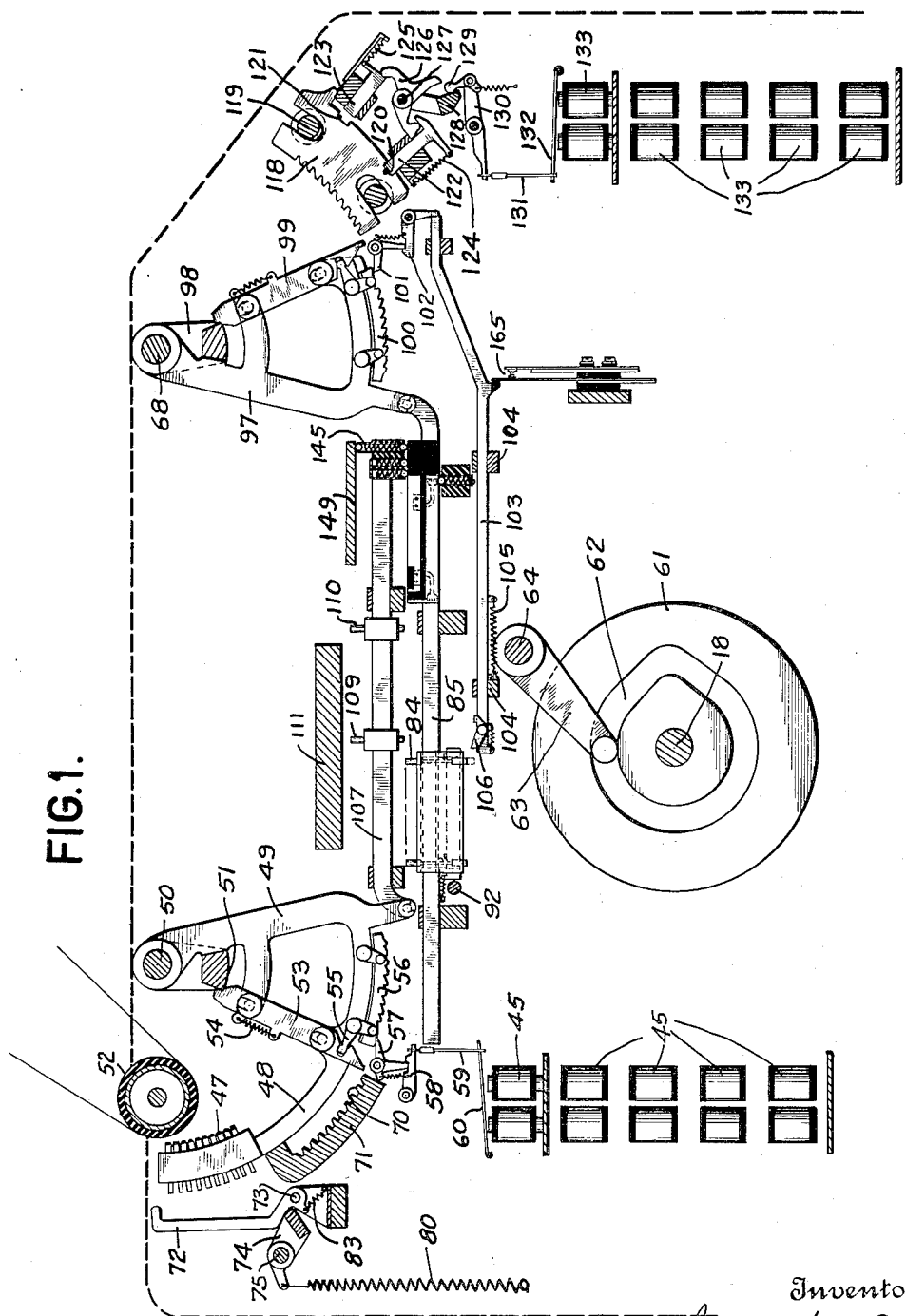
Inventor
James W. Bryce
By his Attorney July 24, 1934.  J. W. BRYCE  1,967,741
TABULATING MACHINE
Filed Feb. 25, 1931   6 Sheets-Sheet 2
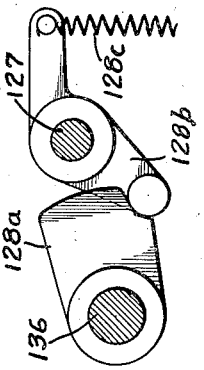
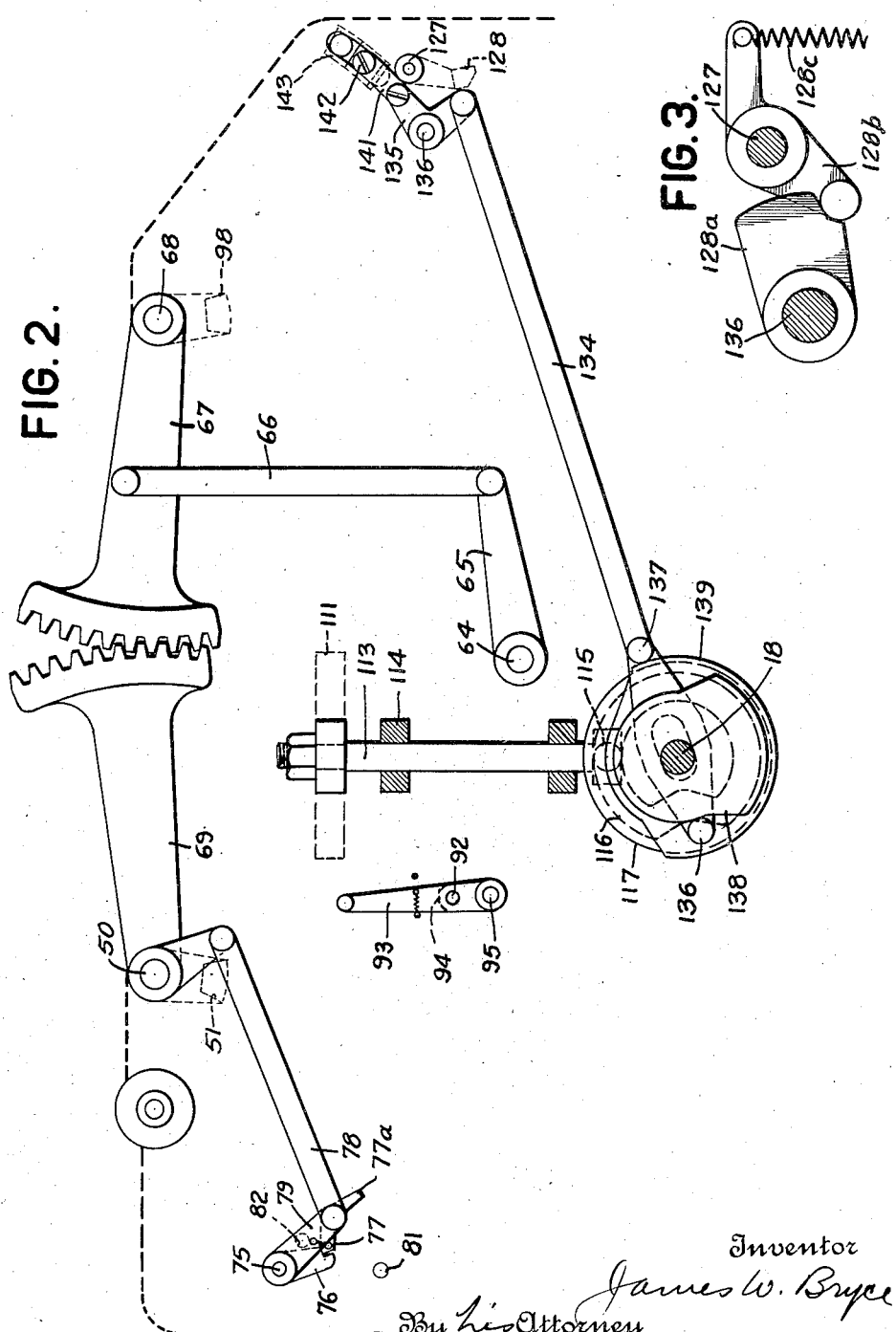
Inventor
James W. Bryce
By his Attorney July 24, 1934.　　　J. W. BRYCE　　　1,967,741
TABULATING MACHINE
Filed Feb. 25, 1931　　6 Sheets-Sheet 3
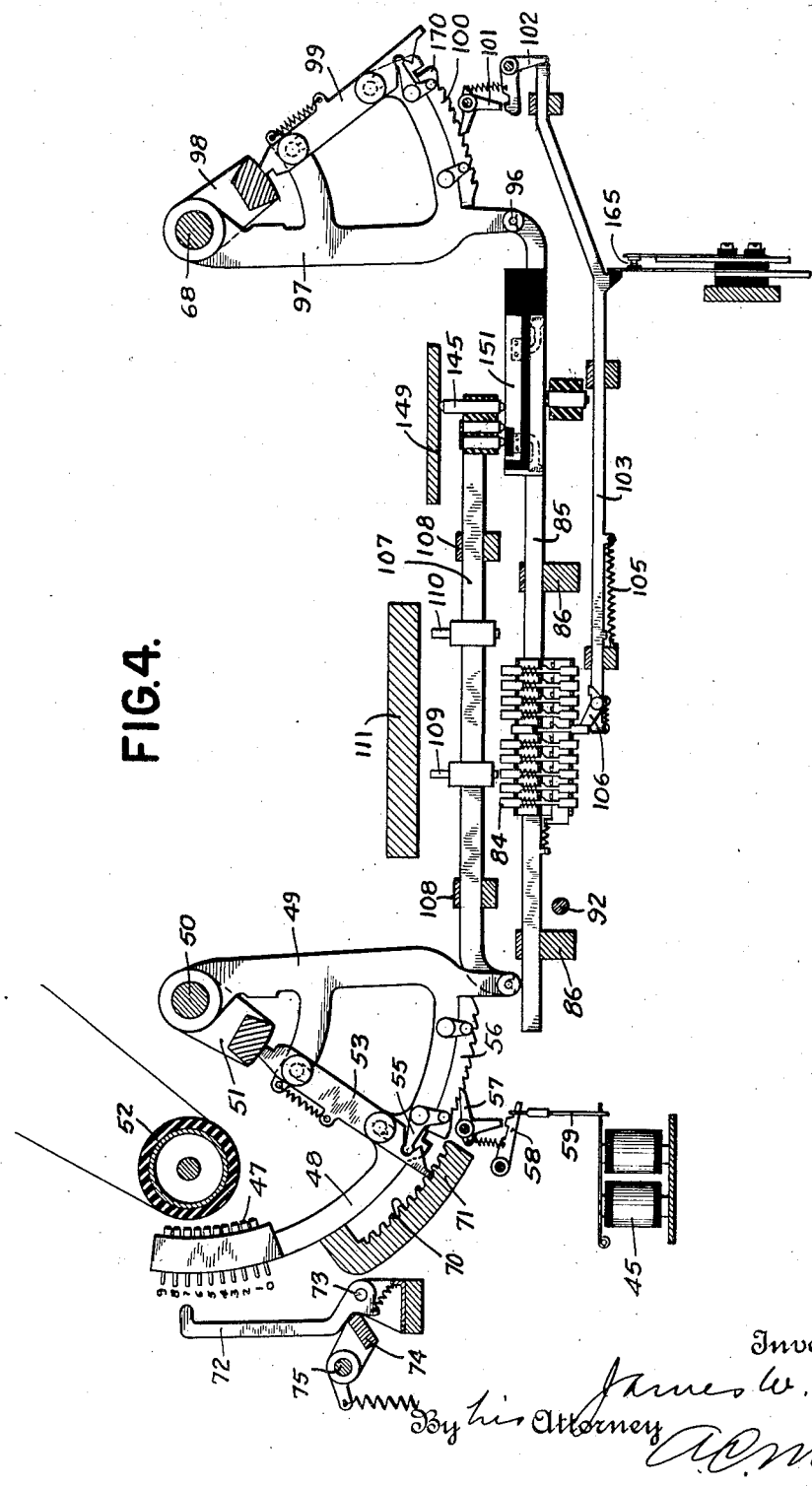

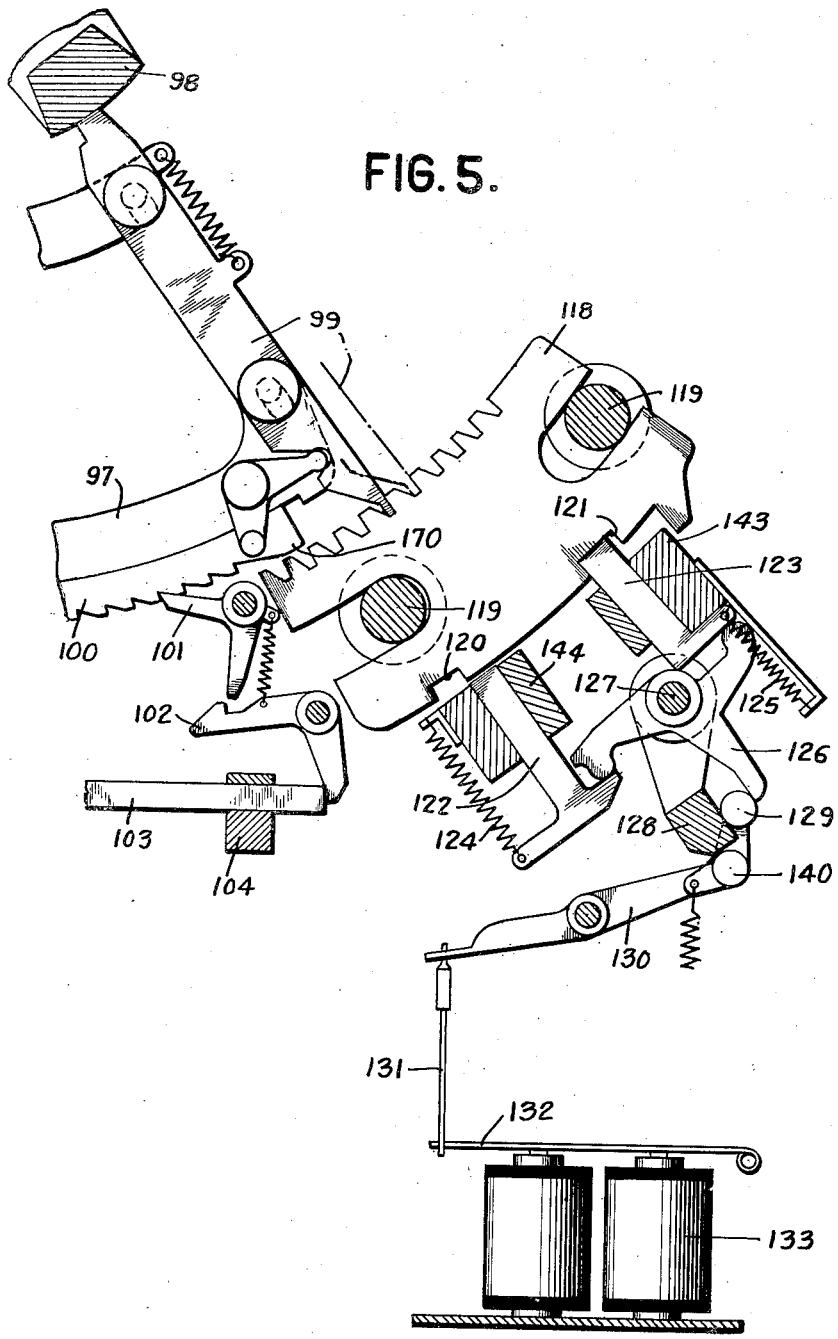

July 24, 1934.　　　J. W. BRYCE　　　1,967,741
TABULATING MACHINE
Filed Feb. 25, 1931　　6 Sheets-Sheet 5
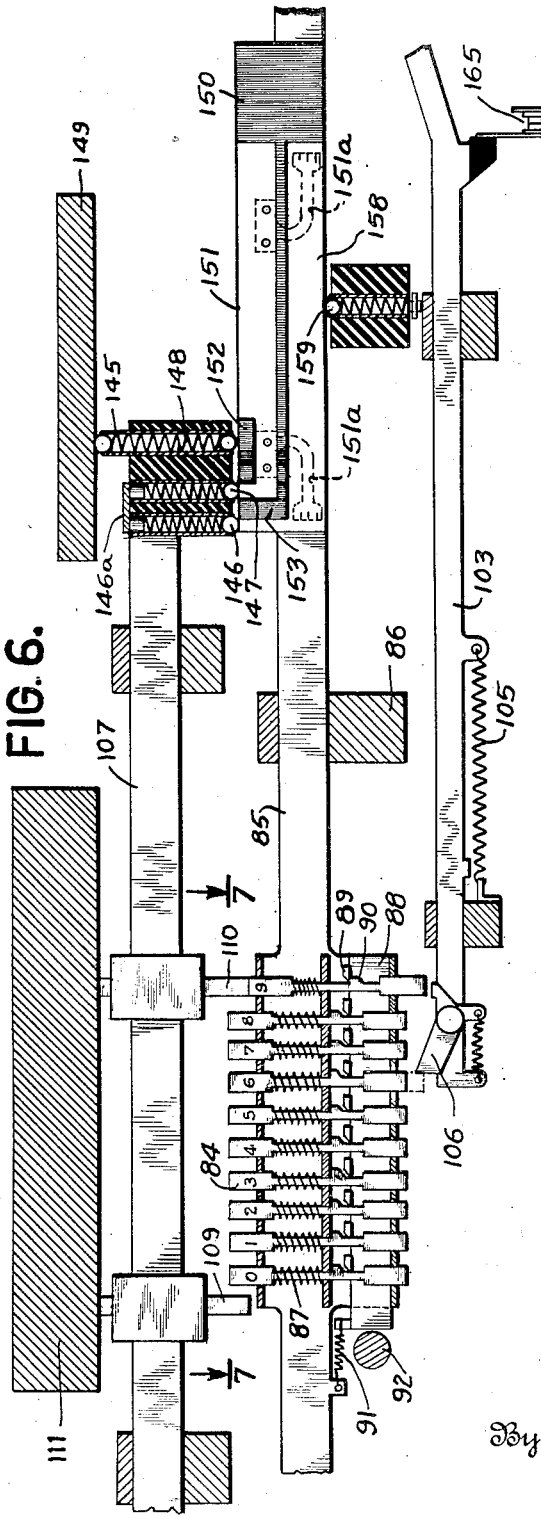
FIG. 6.
FIG. 7.
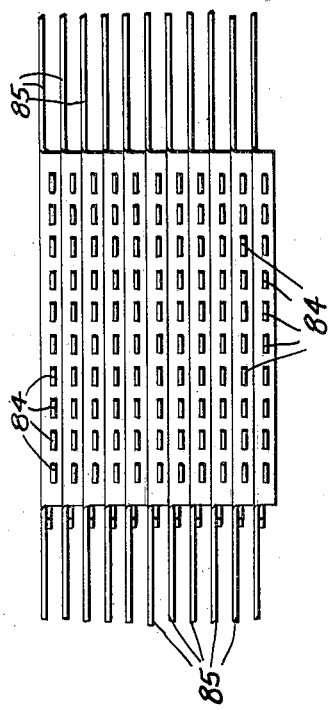
Inventor
James W. Bryce
By his Attorney July 24, 1934. J. W. BRYCE 1,967,741
TABULATING MACHINE
Filed Feb. 25, 1931 6 Sheets-Sheet 6

Inventor
James W. Bryce
By his Attorney
A. D. Maby

Patented July 24, 1934

1,967,741

UNITED STATES PATENT OFFICE 1,967,741

TABULATING MACHINE

James W. Bryce, Bloomfield, N. J., assignor, by mesne assignments, to International Business Machines Corporation, New York, N. Y., a corporation of New York Application February 25, 1931, Serial No. 518,054

11 Claims. (Cl. 235—58)

This invention relates to accounting machines and more particularly to adding and listing machines adapted to be controlled by perforated record cards.

In my copending application, Serial No. 518,055, filed February 25, 1931, I disclosed a machine of this general character in which the usual accumulating pinions are dispensed with and electric contacts employed in their stead. The present invention also dispenses with the usual accumulating pinions and is an improvement upon the mechanism shown in said application.

One of the objects of the present invention is to devise a machine of this character, in which the accumulator forms one of the traveling parts so as to reduce the mechanism necessary to obtain the relative or differential movement between the parts controlled by the number contained in the machine and the new number being added thereto.

Another object is to do away with the necessity of supplying electrically controlled means for ascertaining the value contained in the accumulator when a new value is to be added thereto.

Another object is to devise an improved method and means for effecting carrying from one order to the next higher order.

Another object is to devise an improved means for effecting the mechanical shifting of the parts in connection with the carrying from one order to the next higher order.

These and other objects will appear more fully in the description of the invention which follows:—

Referring to the drawings wherein I have shown what I now consider to be the preferred form of my invention:

Fig. 1 is a side elevation of the adding and listing mechanism associated with one order or column of the machine;

Fig. 2 is a detail of the driving mechanism and the connections to the bails for controlling operation of the type sectors and accumulator sectors, as well as the other parts of the machine;

Fig. 3 is a detail of mechanism associated with the transfer or carry device;

Fig. 4 is a view of the mechanism shown in Fig. 1 with the parts in different positions;

Fig. 5 is an enlarged detail of the carry or transfer mechanism;

Fig. 6 is an enlarged detail showing in side elevation one order of the accumulator as well as the mechanism for setting the same and the mechanism controlled by it;

Fig. 7 is a sectional view taken on line 7—7 of Fig. 6 showing several orders of the accumulator.

Figure 8:
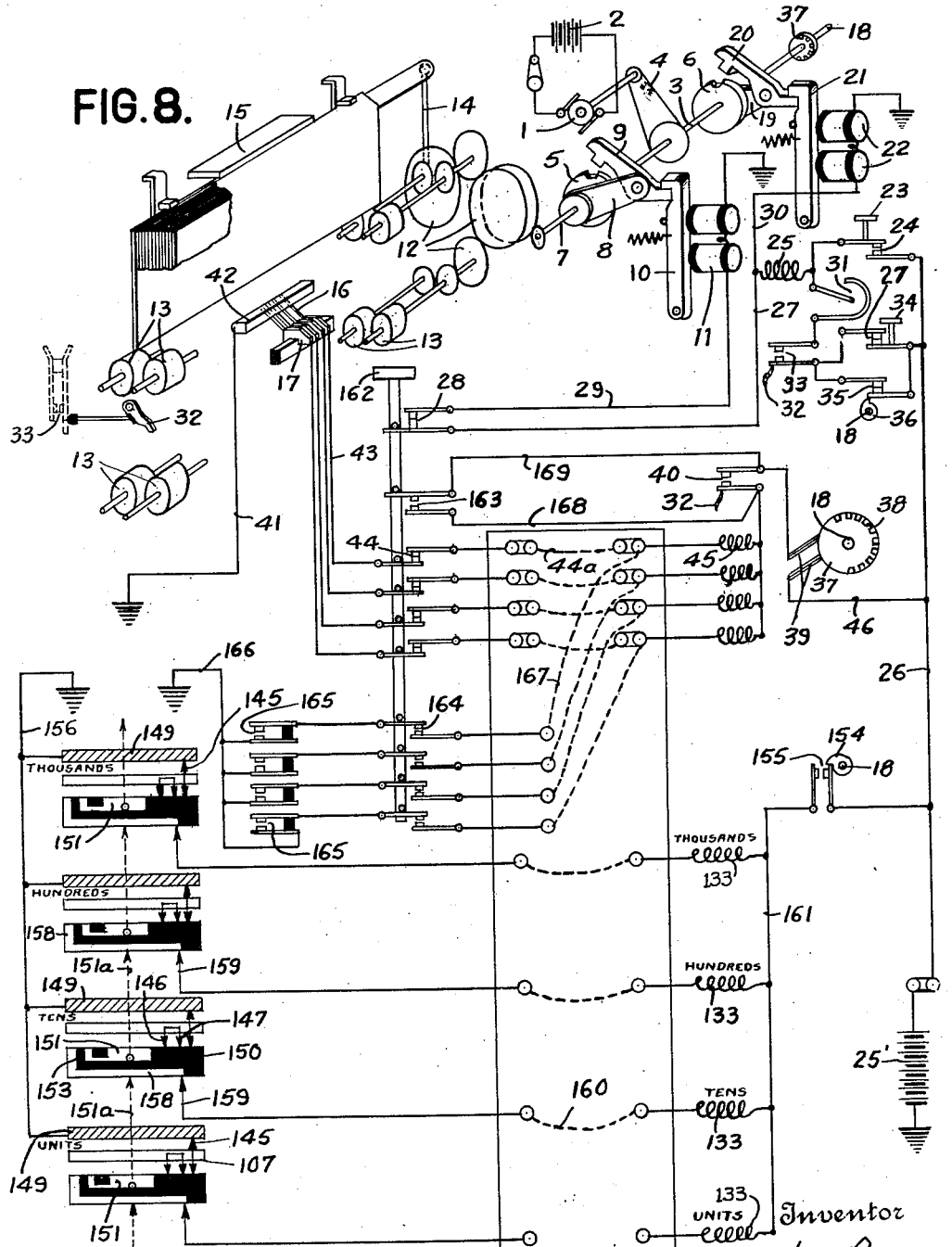
Fig. 8 is a wiring diagram of the electric circuits employed in the control of the machine and shows also a diagrammatic representation of the card feeding and machine control mechanism.

In carrying out my invention, I have illustrated it in connection with perforated card controlled machines in which the well known Hollerith card is employed to control the machine. As is customary in the Hollerith machines, the cards are provided with a plurality of columns of index points. Each column has ten index points ranging in values from zero to nine. The perforation in any one of the ten positions represents that particular value. Cards are fed through the machine with the several index points passing successively between an electric brush and a contact plate so that where a perforation appears the brush will reach through and engage the plate to complete an electric circuit to control the machine.

The time in the cycle of the machine at which this circuit is closed determines the value to be entered in the accumulator or printed by the listing mechanism. The cards are fed so that the "9" position passes the brush first followed by the "8" position and so on down to zero. The arrangement of the type and of the accumulator parts are accordingly designed to correspond with this order of reading. For instance, the type elements are so arranged on the type bar that the "9" type move into printing position first, followed by the "8" type and so on down to zero. The several type elements move synchronously with the feeding of the card through the machine so that as the "9" position in a column passes under the sensing brush the "9" type will be approaching printing line. When a circuit is closed through a perforation at a particular point in the column the circuit thus established will cause the type carrier to stop and the type element corresponding to the position of the hole will then be in position for printing.

The machine is adapted to be operated by an electric motor 1 (Fig. 8) under control of an electric source 2. A shaft 3 connected by a belt 4 to the motor shaft is adapted to be constantly rotated by the motor. Clutch disks 5 and 6 are fixed on the shaft 3. At one end of the shaft 3 and coaxial therewith is the card feed shaft 7 on which is fixed an arm 8 carrying a clutch pawl 9 adapted to cooperate with the notch in the clutch disk 5. A spring actuated latch 10 normally holds the pawl 9 in inoperative position. An electromagnet 11 is adapted to actuate the latch 10 to release the pawl so that the latter will move into engagement with the clutch disk 5 to effect rotation of the shaft 7. The usual gear connection 12 is operated by the shaft 7 to effect operation of the card feed rollers 13 and a link 14 is connected to the card picker 15 for feeding one card at a time to the feed rollers.

The cards are fed downwardly between the sensing brushes 16 and cooperating electric contact plates 17. There is one brush 16 for each column on the card and one plate 17 for each brush. Adjacent to the other end of the shaft 3 and also coaxial therewith is the main cam shaft 18 on which is fixed an arm 19 carrying a clutch pawl 20 for cooperation with the notch in the disk 6 to effect rotation of the cam shaft. A spring pressed latch 21 normally holds the clutch pawl 20 out of cooperation with the clutch disk and the electromagnet 22 will, when energized, attract the latch 21 which constitutes the armature of the magnet and thus release the pawl 20 so that it will cooperate with the clutch disk to effect the rotation of the cam shaft.

The machine may be started by depressing the start key 23 to close contacts 24 thus establishing a circuit from the electric source 25' through wire 26, contacts 24, electromagnet 25, wire 27, contacts 28 normally closed, wire 29, electromagnet 11 and back to the other side of the source through the ground. Also from the magnet 25 the circuit branches through wire 30, magnet 22 and back to the source through the ground. The energization of magnets 11 and 22 will effect the rotation of shafts 7 and 18 to effect feeding of cards and the operation of the other parts of the machine. The energization of magnet 25 will cause closure of contacts 31 and as soon as the first card reaches the card lever 32 the contacts 33 will be closed so that the start key 23 may then be released to permit contacts 24 to open. The circuit will then be shunted from the line 26 through the contacts 27 normally closed, through contacts 33 and 31 now closed and from this point through the magnet 25 and so forth as described.

If the cards fail to feed or after the last card has been fed past the lever 32 the contacts 33 will open, thus breaking the circuit through the magnets 25, 11 and 22 to stop the operation of the machine. If it is desired to stop the machine while cards are still feeding the stop key 34 may be depressed to break the circuit. Whether the circuit is broken through the failure of cards or depression of the stop key, the machine cannot again be started except by a depression of the start key since the deenergization of the magnet 25 will permit contacts 31 to open and the circuit cannot again be closed excepting through the start key contacts 24.

Contacts 35 controlled by a cam 36 mounted on the cam shaft 18 are timed to open at a particular point in the cycle of operation of the machine so that when the stop key 34 is depressed the operating circuit will continue through contacts 35 until they open at the proper time in the cycle. Thus the stoppage of the machine takes place at a predetermined point in the machine cycle. A disk or drum 37 mounted on the shaft 18 is provided with 10 commutator segments 38 adapted to cooperate with brushes 39. The brushes while shown diagrammatically in tandem are in reality mounted side by side so that as the drum 37 rotates the segments 38 will pass in succession under the brushes 39 to close a circuit through the brushes ten times during a machine cycle. The card lever 32 or another one like it may be employed to close the contacts 40 while the cards are being fed through the machine. Thus while a card is passing under the sensing brushes 16, contacts 40 will be closed but when no card is passing under the brushes, that is, between successive cards, these contacts will be open.

Assuming that a card is being fed under the sensing brushes 16 and that a perforation in the particular column in question passes under its brush 16, a circuit will be set up from the ground side of the source, through wire 41, common brush supporting bar 42, the individual brush 16 in question, the corresponding plate 17, corresponding wire 43, corresponding electric contacts 44, plug wire 44a, the corresponding printing magnet 45, contacts 40 closed while the card is being fed, brushes 39 and a contact segment 38, wire 46, wire 26 and back to the other side of the source. The segments 38 are adapted to establish contact between brushes 39 whenever a perforation position is passing under the brush 16. The timing is such that the circuit will be broken between the brushes 39 before the perforation sensing brush 16 rides out of the perforation in the card. This prevents the breaking of the circuit at the card. The energization of the printing magnet 45 controls the mechanisms which will now be described.

*Type bar*

The type elements 47 are carried on an arm 48 of sector 49 loosely pivoted on a shaft 50. A bail 51 may be fixed on shaft 50 and latched to the sector so that the rocking of the shaft clockwise will move the sector 49 to the left to bring the various type elements into printing position with respect to the platen 52. Counterclockwise rotation of shaft 50 will then restore the sectors and type to their normal position. A sliding latch 53 carried by the sector cooperates with the bail to cause the sector to move with the bail toward the left until the latch is drawn downwardly out of the path of the bail whereupon the sector stops. A spring 54 normally holds the latch in cooperation with the bail.

A bell crank 55 pivoted on the sector and cooperating with the latch is also connected to the ratchet bar 56. A spring-pressed pawl 57 is adapted to cooperate with the ratchet bar 56 to stop the movement of the sector and to lower the latch 53 away from the bail. The pawl 57 is normally latched out of position by a latching member 58 which is connected by a wire 59 to the armature 60 of the electromagnet 45.

*Driving mechanism*

Fixed on shaft 18 (Fig. 1) is a cam disk 61 having a cam groove 62 cooperating with a cam follower arm 63 fixed on shaft 64. Also fixed on this shaft (Fig. 2) is an arm 65 connected by a link 66 to a segmental gear 67 fixed on shaft 68 and meshing with a similar segmental gear 69 fixed on the shaft 50. The cam causes the segmental gears to oscillate down and up thus swinging the bail 51 first to the left and then back to the right to normal position. This moves the type carrier sectors to the left and then restores them to the right. The operation of the parts is synchronous with the feeding of the cards through the analyzing position. When a perforation in a particular column appears under the sensing brush 16 the brush will reach through and make contact with the plate 17 thus closing a circuit through printing magnet 45 as stated.

The energization of the magnet 45 as seen in Figs. 1 and 4 releases the latching pawl 57, permitting the latter to move into cooperation with the ratchet bar 56. As the bail 51 continues to press the sector 49 toward the left the bar 56 will be held and thus will cause the bell crank 55 to rock, pulling the latch 53 away from the bail. This will free the type sector from the bail, permitting the latter to continue to the end of its stroke. The latch 53 will be moved downwardly into cooperation with notches 70 in the rack bar 71.

After all of the type sectors have been set and the printing has been effected the bail 51 then rocks back toward the left, sliding over the ends of the latches 53 until the latter ride off from the edge of the bail and spring back into normal position. This releases the sectors from the latching bar 71 and the bail then commences to restore the sectors to normal position.

The actuation of the type elements for printing is effected by hammers 72, one for each sector 49 or column of type. The hammers are loosely pivoted at 73. A bail 74 adapted to rock on the axis 75 reaches across all of the type hammers. An arm 76 (Fig. 2) pivoted at 75 and fixed with respect to the bail 74 is adapted to cooperate with a pawl 77 carried by a link 78 which is connected to an arm 79 loosely pivoted at 75. When the shaft 50 rocks it will move the link 78 with the pawl 77 toward the left thus rocking the arm 76 and with it the bail 74. This in turn compresses the spring 80 until the rear end 77a of the pawl 77 engages a fixed pin 81. This cams the latch pawl away from the arm 76, releasing the bail 74 and permitting it to be actuated by its spring to throw all of the hammers 72 against the type 47. The bail 74 is stopped when the arm 76 strikes the fixed pin 82. The bail moves to the position of Figs. 1 and 2 and the hammers are carried the remainder of the distance by their momentum so that they strike the type elements with a snap and then spring back under action of their springs 83, against the bail where they then rest. This operation of the hammers of course takes place after all of the type sectors 49 have been set and latched in position and before the bail 51 commences its return stroke.

*Accumulator*

The accumulating device is made up of a plurality of orders of stops 84. There are ten of these stops to each order carried by a bar 85 slidably mounted in bearings 86. The stops are pressed upwardly by their springs 87 to normal position and when depressed are adapted to be latched down by a latching bar 88 provided with a plurality of projections 89 adapted to cooperate with projections 90 on the stops 84. The projections 89 and 90 are bevelled so that depression of any stop will cam the plate 88 to the right, permitting any stop that is in the lower position to be restored by its spring 87. The latching plate 88 will then be moved by its spring 91 into position to latch the stop 84 which is being depressed, in that position. A bar 92 reaches across the ends of all of the latching plates 88. This bar is carried by arms 93, 94 fixed on a rod 95. Rocking of the arm 93 in a clockwise direction as viewed in Fig. 2 moves the rod 92 against the latching plates. This moves all of the plates to the right, releasing all of the stops 84 that may be in latched down position so that they may all rise. Each bar 85 is connected by pin and slot 96 to an accumulator sector 97 loose on the shaft 68. A bail 98 is fixed on this shaft so that as the shaft rocks clockwise as viewed in Fig. 2 the bail will be moved toward the right and when the shaft rocks counterclockwise the bail will be restored to its normal position. Each accumulator sector 97 is locked by a latch 99 to the bail so that the latter will carry the sectors toward the right until the latch is lowered to release the sector from the bail.

Latch 99 is connected to the ratchet bar 100 which is adapted to be engaged by a pawl 101. This pawl is normally latched out of cooperation with the bar 100 by a latch 102. A bar 103 slidably mounted in supports 104 is normally held in position to the left by a spring 105. The left end of the bar 103 carries a spring pressed flipper 106. There is one bar 103 for each order of accumulator stops 84.

Assuming that there is nothing in the accumulator and that a card is analyzed having a perforation in the "6" position in a particular column, the magnet 45 will be energized to stop the type sector 49 with the "6" type element 47 in printing position. The type sector is connected to a slide bar 107 mounted in supporting bearings 108 so that as the sector moves to the left, it will move the bar 107 a corresponding distance in the same direction. The bar 107 carries two plungers 109, 110. Normally these plungers occupy the position of Fig. 1 with respect to the accumulator stops 84. The accumulator sector 97 is adapted to be actuated by the bail 98 simultaneously with the movement of the type sector. Having assumed that there is nothing contained in the accumulator, the sector 97 will move its full distance to the right carrying with it bar 85 with its order of stops 84. The bar 107 having been moved to the left to the "6" position and the bar 85 having been moved to the right its full distance, the plunger 110 will rest above the stop 84 representing the value "6". An operating plate 111 will then be depressed to actuate the plungers 109, 110 so that wherever a plunger is directly above one of the stops 84 that particular stop will be depressed and latched in this position. The other parts will then be restored to normal position. Assuming now that the next card has a perforation in the "3" position in this particular column, the type sector will be stopped in such position and the accumulator sector will be moved by the bail 98 until it is stopped. This operation is brought about by the cooperation of the flipper 106 with the stop 84 which had previously been depressed. In Fig. 6 the bar 85 has moved to the right until the "6" stop 84 engages the flipper 106. This causes the bar 103 to be moved toward the right.

The bar 103 is adapted to engage and rock the latch 102 to release the latching pawl 101. The latter will thereupon rock into engagement with the ratchet bar 100 to stop the parts in this position. The relative positions of the bars 107 and 85 are now such that the plunger 110 will be in position directly above the stop 84 representing the value "9" as in Fig. 6. Now when the operating plate 111 is depressed the "9" stop will be set and latched in position while the "6" stop will be released and permitted to return to its normal position. The operating plate 111 is attached at its opposite ends to links 113 slidably mounted in supports 114 and provided at their lower ends with cam follower rollers 115 cooperating with cam grooves 116 in cams 117 fixed on the cam shaft 18. The cams are adapted to lower and raise the plate at the proper time after the type sectors and accumulator sectors have been set and before they commence their return movement.

Carry operation

The carrying or transferring from one order in the accumulator to the next higher order is effected by moving the proper accumulator sector 97 back one step. When the latching pawl 101 cooperates with the ratchet bar 100 rocking the latch 99 out of the path of the bail 98, the latch moves into cooperation with the locking bar 118. This bar is slidably mounted on rods 119 reaching across all of the accumulator sectors 97. Each bar 118 is provided with two notches 120, 121 adapted to cooperate with plungers 122—123. The parts are normally in the position of Fig. 1 with the plunger 122 in the notch 120; held in such position by a spring 124. The plunger 123 on the other hand is held out of notch 121 by its spring 125.

An arm 126 having three projections cooperates with the plunger 122 to move the latter out of the notch 120, and with the plunger 123 to move the latter into the notch 121. The arm is pivoted at 127. Also pivoted at 127 is a bail 128 reaching across the lower projection of all of the arms 126. Associated with each arm 126 is an interposer 129 carried by a rocking arm 130 which is connected by a wire 131 to the armature 132 of an electromagnet 133. A link 134 (Fig. 2) connected to a bell crank 135 pivoted at 136 is adapted when it moves to the left, to rock the shaft 136 clockwise and with it the cam 128a (Fig. 3). This will rock arm 128b fixed on shaft 127, against the action of its spring 128c. Thus, the bail 128 will be rocked to the right or counterclockwise at the very beginning of the stroke of the link 134. The link 134 is slotted near its lower end, and is mounted on the shaft 18. Cam follower rollers 136, 137 carried by the link 134 cooperates with complementary cams 138, 139 fixed on the cam shaft 18. This causes the link 134 to be moved back and forth to the right and left. The normal position of the interposer 129 is as shown in Fig. 1 so that when the bail 128 rocks toward the right it will rock the interposer about its pivot 140 on the rocker arm 130 but will not affect the arm 126. When the magnet 133 is energized, however, the arm 130 will be rocked counterclockwise, moving the interposer 129 into the position of Fig. 5 between the bail 128 and the arm 126. Now when the bail is rocked toward the right, moving the interposer 129, the latter will rock the arm 126 and this will press the plunger 122 out of its notch 120 and press the plunger 123 into its notch 121. While the parts are in this position the continued movement of link 134 to the left in Fig. 2 will rock the bell crank 135 clockwise about its pivot.

One arm of bell crank 135 is connected to a link 141 connected at 142 to the bar 143 which carries all of the plungers 123. Similar linkage may be connected at the other end of bar 143 and one of the links fixed to the shaft 136 so that both sets of links will operate simultaneously to move the bar 143 downwardly and toward the left as viewed in Figs. 2 and 5. The bar 144 which carries all of the plungers 122 is fixed. The movement of bar 143 to the left takes place after the bail 128 has been moved to the right. Thus, wherever a plunger 123 has been moved into cooperation with its locking bar 118 the movement of the bar 143 toward the left will carry with it those particular locking bars 118. And where the latch 99 had moved to the dotted line position of Fig. 5 it will be moved back to the full line position with its accumulator sector 97, restoring this sector one notch toward the left. The movement of the locking plate 118 a step back is of course brought about under control of a bar 103 associated with the accumulator stops 84 of the next lower order. Thus where the bar 85 is set with one of its stops 84 in position to be depressed by one or the other of plungers 109, 110 the carry operation will move the bar 85 to the left to shift the relative positions of the stops 84 and the plungers 109, 110 so as to depress the plunger of the next higher value. In other words, if the stop 84 representing the value "7" is under the operating plunger the bar 85 will be moved to bring the stop representing the value "8" under the plunger.

The carry magnet 133 of any order is energized under control of contacts or brushes 145, 146, 147 (best shown in Fig. 6) which are carried by insulating block 148 mounted on the bar 107. The contacts 145 cooperate at their upper ends with a common plate 149 and are adapted to cooperate at their lower ends with an insulating portion 150, contact strip 151, insulator 152, insulator 153, all carried by a bar 85 of the same order.

The contacts associated with a particular order, of course, control the carry magnet 133 of the next higher order. Normally the contacts or brushes 145, 146, 147 all rest upon the insulator 150; that is, when the parts are in normal or zero position as in Fig. 1. When the bar 107 moves to the left it will carry the contacts with it causing them to slide over the insulator and contact strip 151, etc.

In any position in which the plunger 109 is above one of the stops 84, the contact brush 145 will cooperate with the common plate 149 and the contact strip 151 to effect closure of a circuit through the carry magnet of the next higher order at the proper time in the cycle of the machine, controlled by the cam 154 (Fig. 8) fixed on shaft 18 and adapted to close the contacts 155. Contacts 155 are closed after the plungers 109, 110 have been moved by the operation sector 49, into position with respect to the stops 84 but before the common plate 111 is depressed. The circuit will be from the grounded side of the power source 25' through wire 156, common plate 149 (of the units order, for example), contact brush 145, contact strip 151, brush 151a to contact strip 158 carried by the bar 85 of the next higher order (the tens order in this instance) and from this strip through contact brush 159, plug wire 160, the carry magnet 133 of the higher order (again the tens order), wire 161, contacts 155 and back to the other side of the source.

Assuming that this carry operation was from the units order to the tens order as stated and assuming also that the relative positions of the bars 107 and 85 of the tens order is such that the value "9" is to be set up in the accumulator, the contact brushes 145, 146, 147, etc. will be in the positions shown in Fig. 6. Here, it will be seen that the contact brush 145 engages the insulating block 152. Contact brush 147 is in engagement with contact strip 151 and brush 146 is in engagement with contact strip 158. In this position the current coming from the contact strip 151 of the units order through brush 151a to the strip 158 of the tens order will branch through brush 146, bus bar 146a, brush 147, contact strip 151, brush 151a, to contact strip 158 of the hundreds order, brush 159, transfer magnet 133 of the hundreds order and back through wire 161 and contacts 155 to the other side of the source. Thus carrying will take place from the units to the tens order and also through to the hundreds order.

The rack 118 (Fig. 5) of the tens order will thus be shifted back one step so that the plunger 110 will be moved away from the "9" stop 84 and the plunger 109 be moved over the zero stop 84 and zero will be set up in this order instead of the nine. The proper shifting of the accumulator sector 97 also takes place to effect the proper entry in the hundreds accumulator order.

*Total taking*

To take a total the total button 162 will be depressed, opening contacts 28, 44 and closing contacts 163, 164. The start key 23 will then be depressed to start the machine. The circuit through the card feed magnet 11 is now open at contacts 28 so that the card feeding mechanism will remain idle. The magnet 22, however, will operate to cause operation of the cam shaft 18 and the parts of the machine operated thereby. This will cause operation of the type sectors 49 and the accumulator sectors 97. The type elements 47 are moved into printing position synchronously with the movement and the accumulator stops 84 with respect to the flipper 106. When the depressed stop 84 engages the flipper 106 it will move the bar 103 toward the right, closing contacts 165. Referring to Fig. 8 it will be seen that a circuit will at this moment be closed from the ground side of the source 25', through wire 166, contacts 165, contacts 164 closed by the total key, plug line 167, corresponding printing magnet 45, wire 168, contacts 163, closed by the total key, wire 169, brushes 39 through the corresponding contact segment 38, wire 26 and back to the source.

The energization of magnet 45 will stop the type sector 49 in position to bring the type element 47 corresponding to the accumulator stop 84 into position for printing the value represented by the stop 84.

The movement of the bar 103 to the right also actuates the latch 102 to release the pawl 101 so as to stop the accumulator sector 97. After all the type sectors have been set the printing hammers 72 will be actuated in the usual manner to effect the printing of the total. The parts will then be restored to normal position.

In totaling as well as in accumulating, when the accumulating sectors 97 are restored to normal position, the ratchet bars 100 will click over the pawls 101 until the high portion 170 reaches the pawl and depresses it far enough to permit it to be latched out of position by the latch 102, the bar 103 having, of course, returned to its normal position to the left before this.

In Fig. 8 the contact strip 151 of one order of the accumulator is represented as being connected to the contact strip 158 of the next higher order by a brush 151a. Referring to Fig. 6, it will be seen that there are two of these brushes 151a attached to the contact strip 151 of each order and reaching downwardly and over to the contact strip 158 carried by the bar 85 of the next higher order. The reason for supplying two of these brushes 151a is to maintain contact throughout the wide relative movements that may take place between adjacent bars 85.

It should be noted in connection with Fig. 6 that while the contacts 145, 146, 147 are near the left end of contact strips 151, 158, this is not the end of the relative movements of these parts, for it will be seen that the bar 85 may move farther to the right and bar 107 may move farther to the left so as to bring plunger 110 over the zero stop 84 or any intermediate stop.

When the bar 85 moves farther to the right or bar 107 moves farther to the left the contacts 145, 146, 147 will pass beyond the left end of the contact strips 151, 158, etc. and will ride back upon the contacts when the parts are restored. It may also be stated that when the bar 85 is one step farther to the right than shown in Fig. 6, brush 145 will be farther to the left but still in contact with insulating block 152. Brush 146 will pass out of the contact with strip 158 and thus it makes no difference whether brush 147 makes contact with an insulated block or strip 158. When the parts move still another step farther the brush 145 will move into contact with insulating block 153 and the next step will then carry the brush 145 out of contact with either strip 151 or 158. Thus, after the parts have passed the position shown in Fig. 6 for carrying through a particular order there will be no further connection between brush 145 and strip 151 to control carrying.

In Fig. 8 the units order is shown as having a carry magnet 133 adapted to be connected for operation by a plug 160. While such a magnet is not ordinarily necessary since it is not usual to carry into the units order in an adding machine, it is possible in my machine to split the accumulator at any point and make any order the units order. In such an arrangement the units order will be disconnected from what would otherwise be the next lower order, by omitting the plug connection 160. The carry magnet associated with the units order is therefore idle.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

1. In an accounting machine, a movable type bar, a second movable bar, a plurality of settable stops carried by the said second named bar, means for controlling the setting of said second bar, means controlled in accordance with the setting of the type bar for controlling the setting of said stops with respect to said second named bar and means controlled by said stops for controlling the setting of said type bar for taking totals.

2. In an accounting machine, a movable entry receiving member, a plunger carried by said member, a movable bar, a plurality of settable stops carried by said bar, and means for actuating said plunger to effect selective setting of said stops for entering a value therein.

3. In an accounting machine, a plurality of relatively movable members, a plurality of settable denominational stops carried by one of said members, means controlled by the relative positions of said members for controlling the setting of said stops, means operable by the setting of one stop for releasing another set stop, and means controlled by said stops for controlling the setting of said members.

4. In an accounting machine, a plurality of movable members, a plurality of settable denominational stops carried by one of said members, means controlled by the relative positions of said members for selectively setting one of said stops relatively to its carrying member and means controlled by said stops for controlling the setting of one of said members for taking a total.

5. In an accounting machine, a plurality of rows of movable bars, a plurality of rows of settable denominational stops, means controlled by said bars for effecting selective setting of said stops to represent values, and additional means controlled by said bars for effecting a carry operation from one row of stops to another.

6. In an accounting machine, a pair of movable bars, means for effecting synchronous movement of said bars, a plurality of stops mounted on one of said bars, means controlled by a perforated record card for controlling the setting of one of the bars, and means controlled by said one of said bars for controlling selective setting of said stops to represent values.

7. In an accounting machine, a plurality of pairs of relatively movable bars, means for effecting synchronous movement of the bars of each pair, type elements controlled by one of the bars of each pair, accumulator elements comprising a plurality of stops carried by the other bar of each pair, means controlled by the relative positions of the bars of each pair for effecting selective setting of the corresponding stops, means for carrying from the stops associated with one bar to the stops associated with another bar and means controlled by said stops for controlling printing by said type.

8. In an accounting machine, a pair of relatively movable bars, means for effecting synchronous movement of the bars, a row of stops carried by one of the bars, perforated card controlled means for selectively stopping the other of said bars, a set of type carried by said other of said bars, and additional means controlled by said stops for effecting stoppage of said other of said bars for controlling the printing of totals.

9. In a perforated record controlled adding listing machine, a plurality of movable type carriers, a plurality of orders of movable denominational stops, means controlled by said carriers for effecting selective setting of said stops including means for effecting a carry operation from one order of stops to the next higher order, and means controlled by said stops for controlling the setting of said carriers for effecting printing of totals.

10. In a perforated record controlled adding listing machine, a plurality of movable type carriers, means controlled by a perforated record for controlling the setting of said carriers, a row of settable denominational stops associated with each carrier, means for moving each row of stops relatively to the corresponding type carrier, means controlled by the relative positions of the type carriers and rows of stops for effecting selective setting of the stops, means controlled by one row of stops for effecting carrying to the next row, and means controlled by said stops for controlling the setting of the type carriers for effecting printing of totals.

11. In an accounting machine, a plurality of movable bars, a series of settable denominational stops carried by each bar for representing values, means controlled by the position of the bars for selectively setting the stops, a movable member, and means for locking the bars to said member for effecting movement of the bars to effect carrying from one order to the next.

JAMES W. BRYCE.